Oct. 21, 1924.  
F. G. HENRY  
1,512,889  
MACHINE FOR OPERATING ON BLADES  
Filed Aug. 30, 1920 5 Sheets-Sheet 3
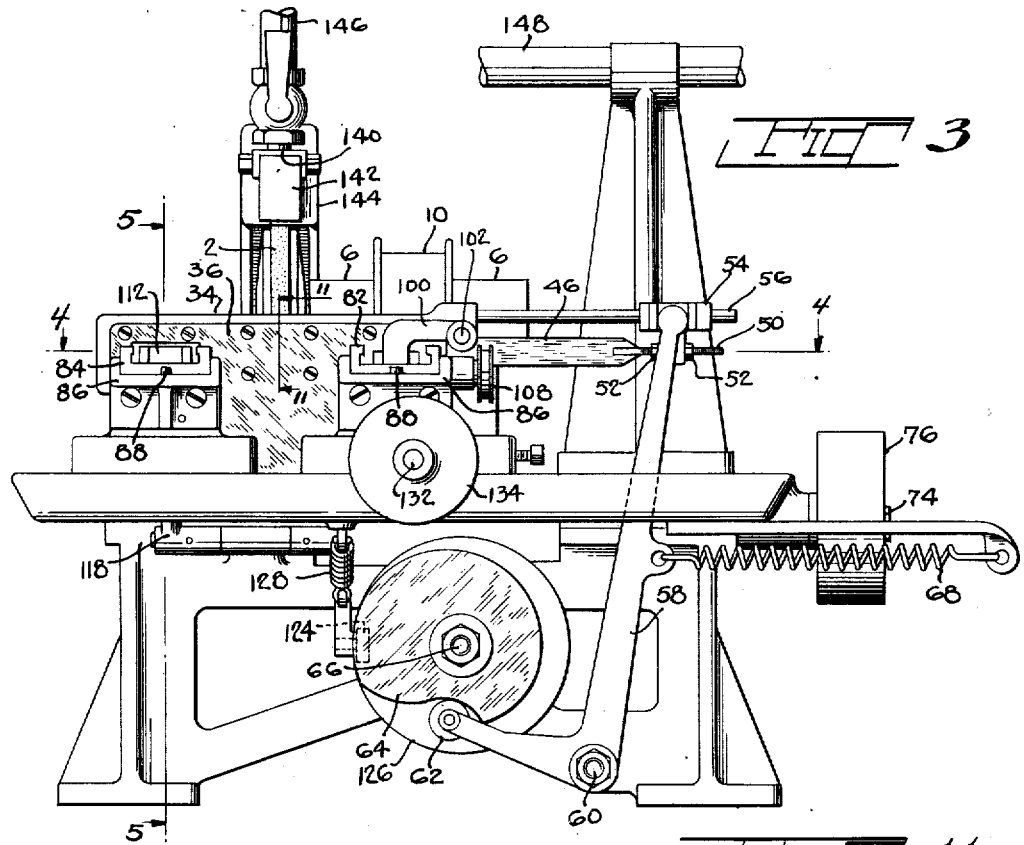
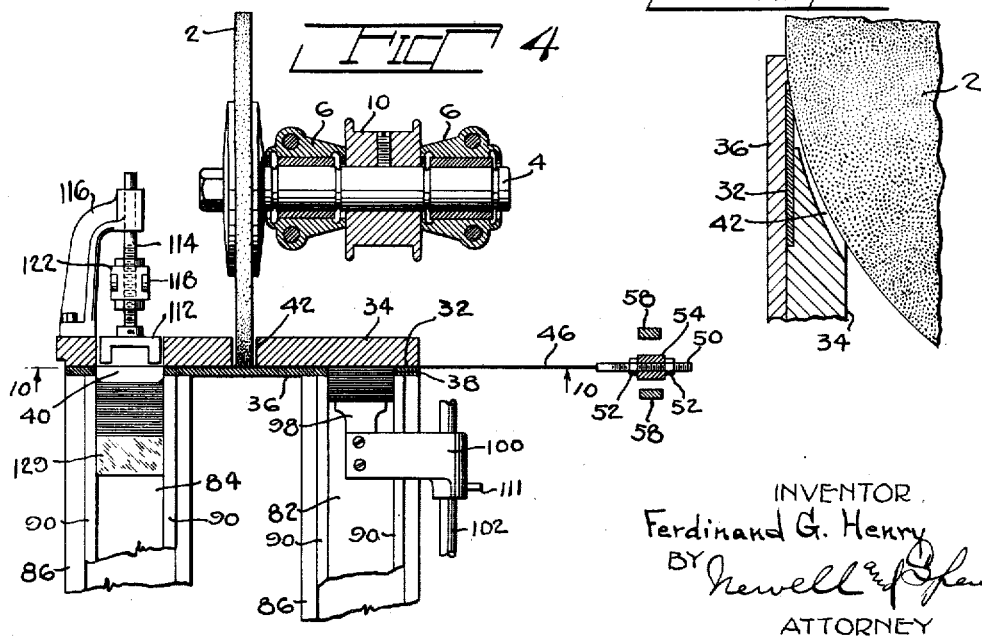
INVENTOR  
Ferdinand G. Henry  
BY  
ATTORNEY

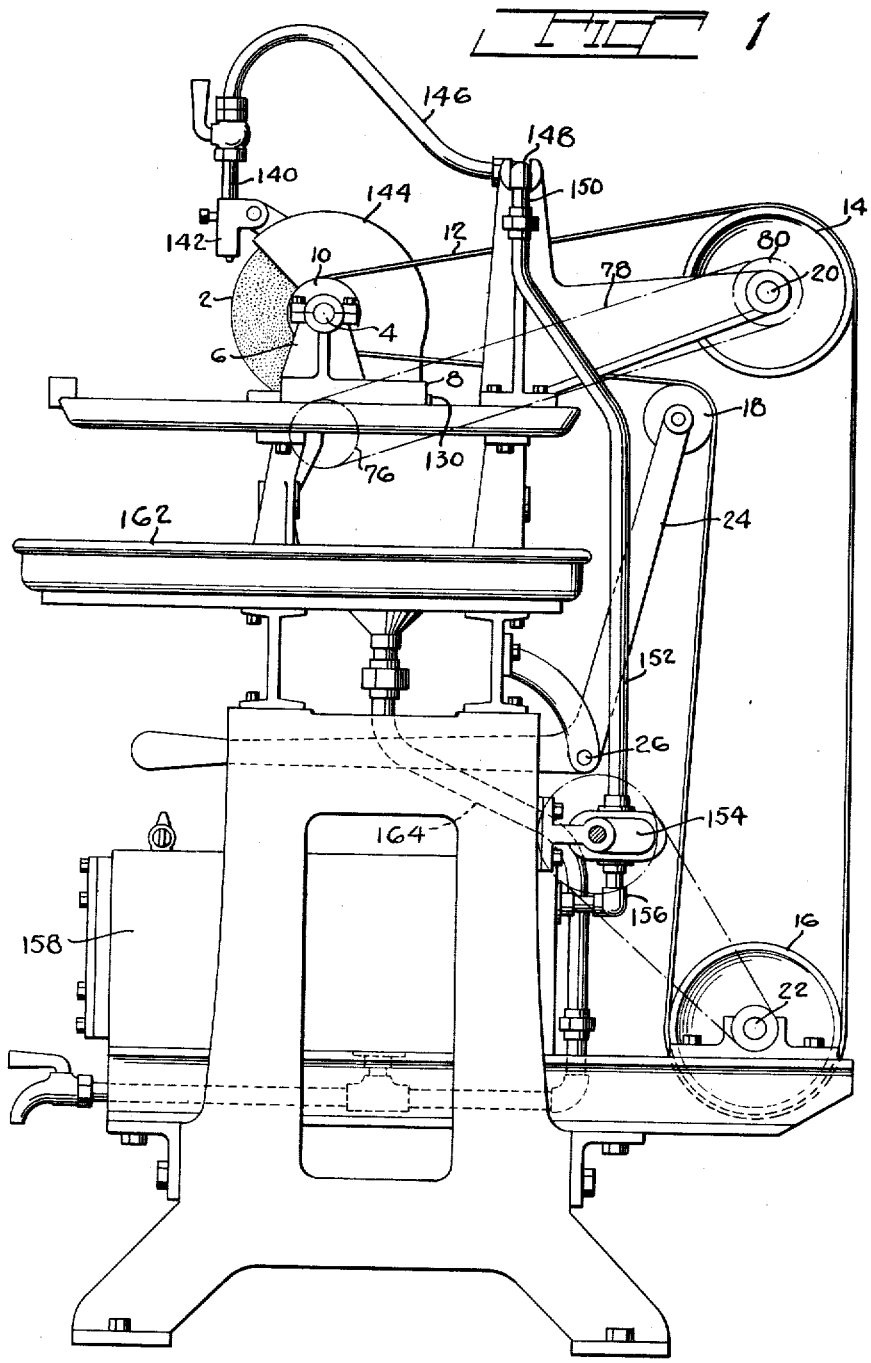

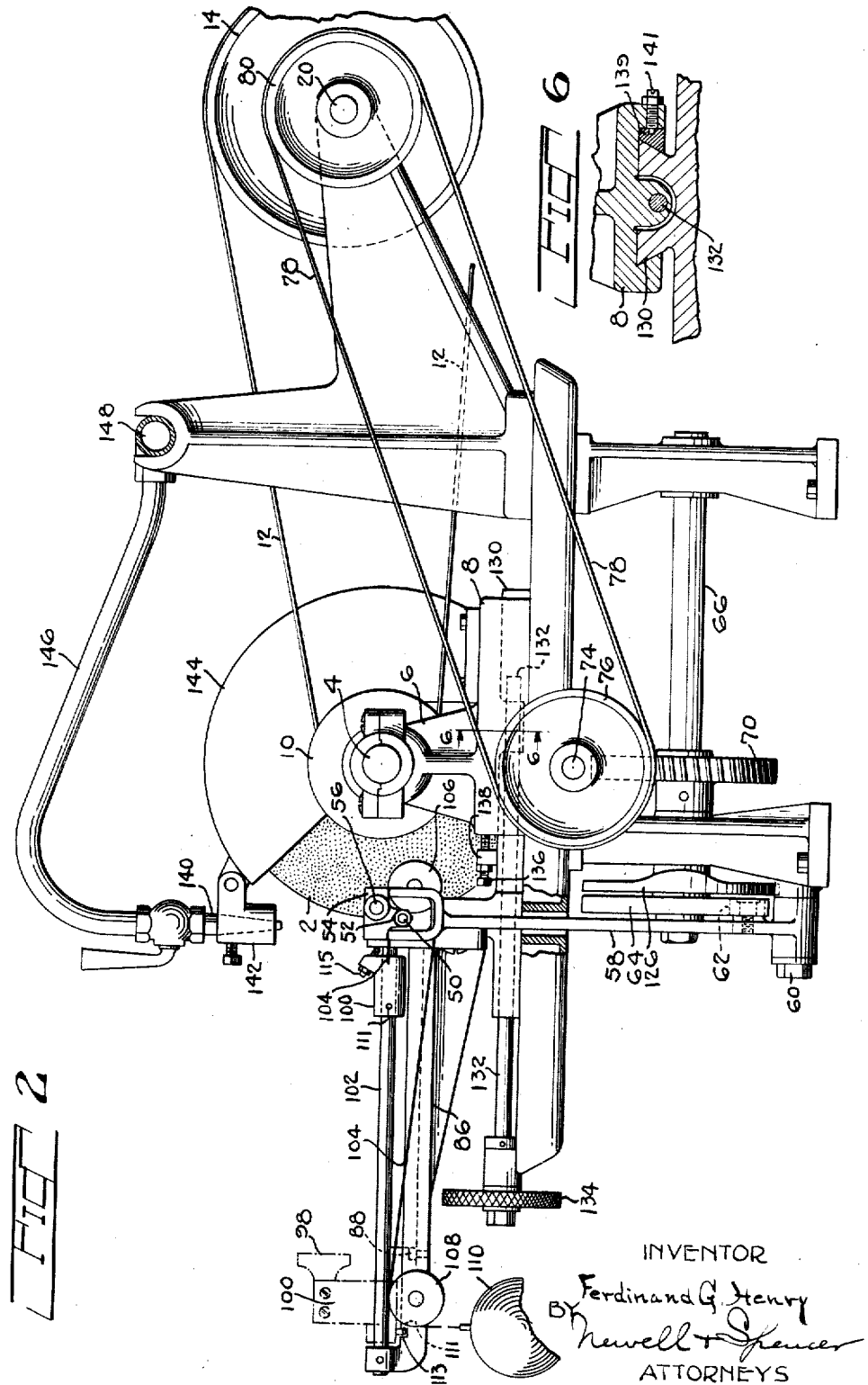

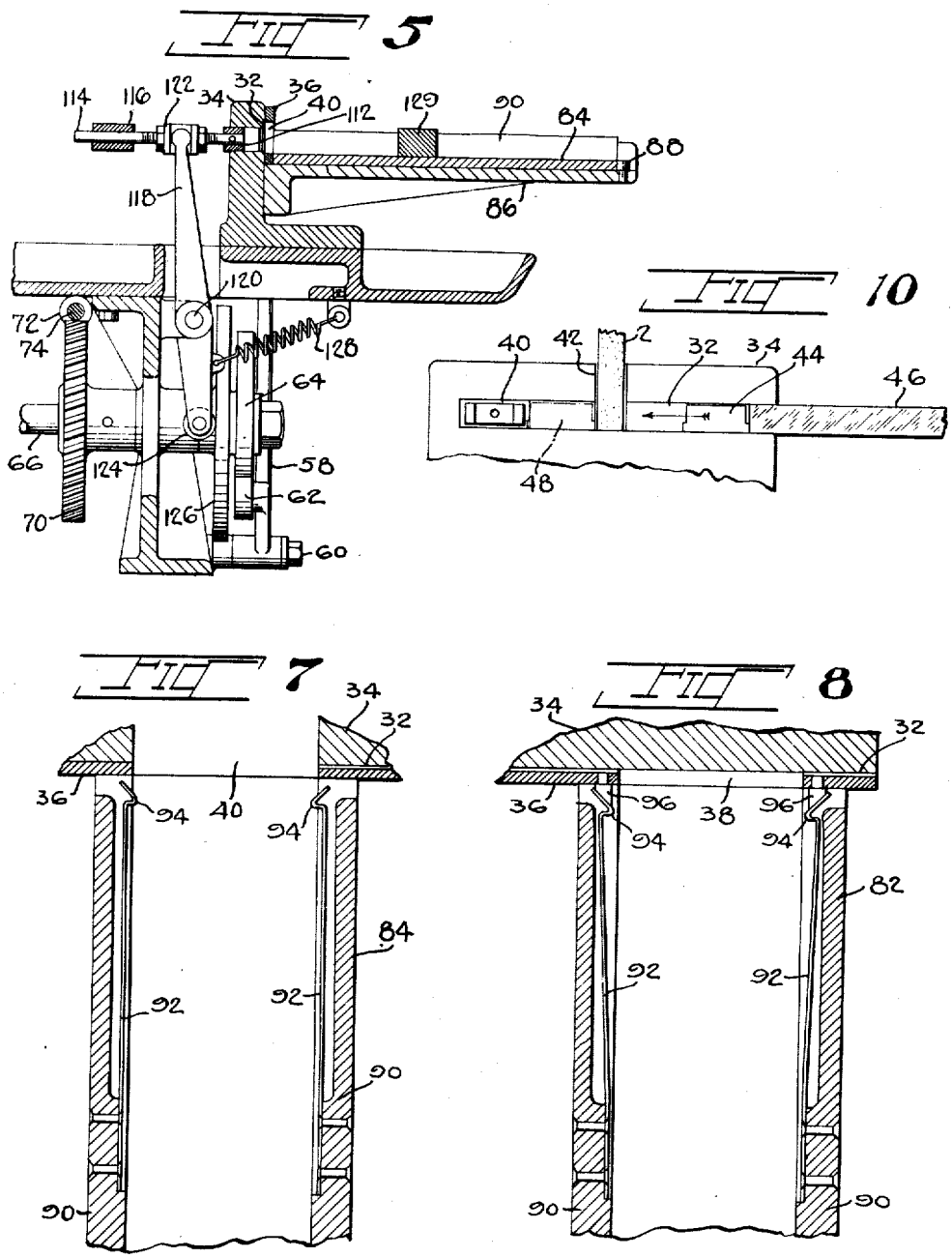

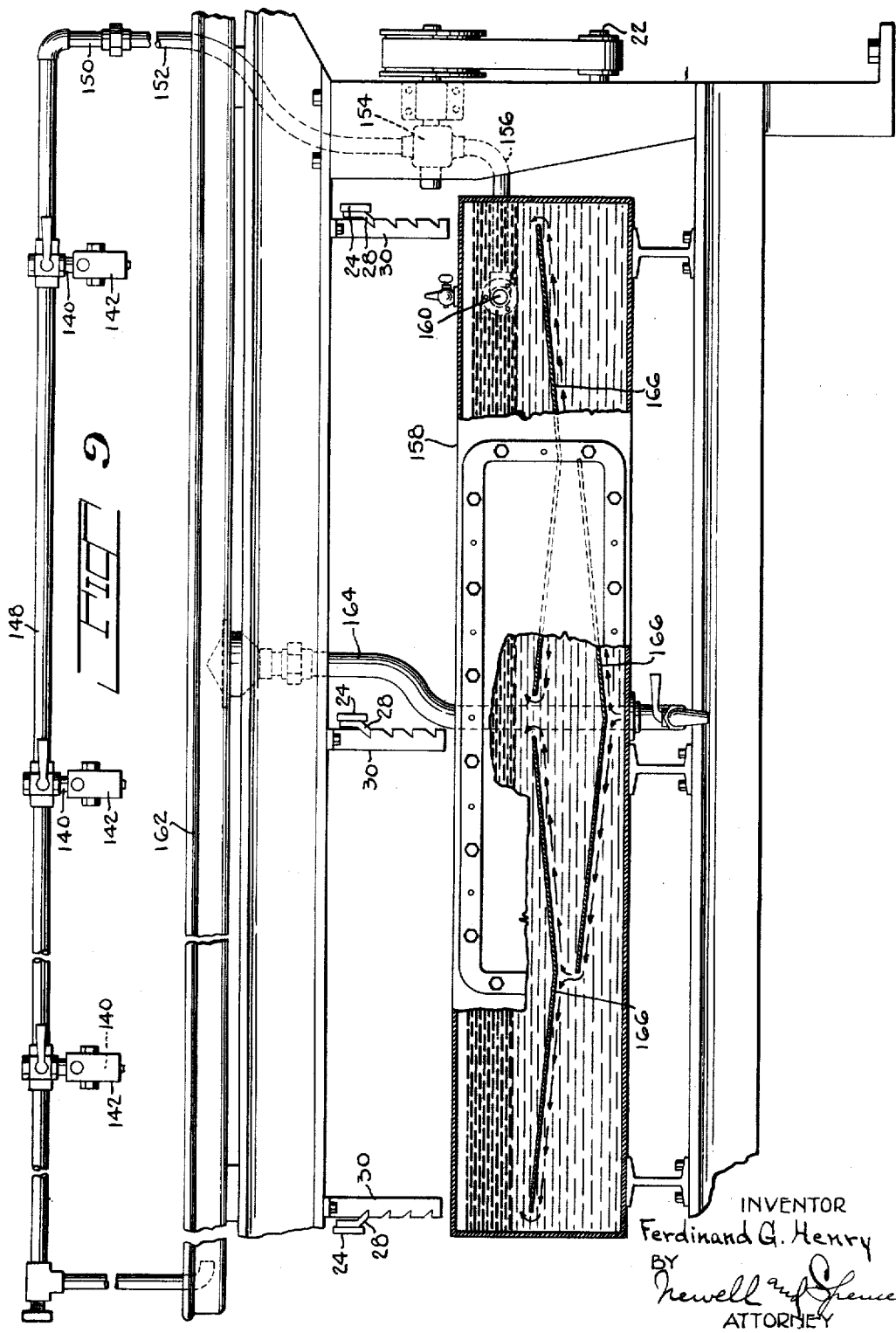

Patented Oct. 21, 1924.

1,512,889

UNITED STATES PATENT OFFICE.

FERDINAND G. HENRY, OF NEW YORK, N. Y., ASSIGNOR, BY MESNE ASSIGNMENTS, TO WALDEN KNIFE COMPANY, OF WALDEN, NEW YORK, A CORPORATION OF NEW YORK.

MACHINE FOR OPERATING ON BLADES.

Application filed August 30, 1920. Serial No. 406,897.

*To all whom it may concern:*

Be it known that I, FERDINAND G. HENRY, a citizen of the United States, residing at New York, New York, have invented certain new and useful Improvements in Machines for Operating on Blades, of which the following is a clear, full, and exact description.

This invention relates to machines for operating on blades, and is illustrated in the present application as embodied in a machine for grinding the edges of the thin removable blades employed in certain kinds of safety razors. The invention is not limited, however, to this latter class of machine, but certain features thereof may be embodied with advantage in machines for performing other operations on blades, and certain features also may be applied to machines for operating on other kinds of blades. It is to be understood therefore that, except as defined in the claims, the invention is not limited to machines for operating on any particular class of blades, or to machines for performing any particular operation on the blades.

One object of the invention is to improve and simplify the construction and mode of operation of machines of the class described, and to produce a machine in which a series of individual blades are presented in succession to the means for operating on the edges of the blades, are operated upon by said means, and are delivered therefrom after the completion of the operation with a minimum of labor and attention on the part of the operator.

Another object of the invention is to produce a machine of the above class constructed and arranged to act automatically to take blades from a pack or stack, to present the blades accurately in predetermined relation to the means for operating on the edges thereof, and to deliver the blades to another pack or stack after the completion of the operation, which is simple in construction, comparatively inexpensive to manufacture, and which will perform its operation in a reliable manner.

With these and other objects in view, the invention comprises certain novel and improved features hereinafter described and particularly pointed out in the claims, the advantages of which will be readily understood and appreciated by those skilled in the art.

In the preferred form of the invention, the machine is provided with a guideway extending past the operating means in which the blades are held while being operated upon. The blades are delivered in succession to the guideway from a portable supply galley constructed and arranged to hold a pack or stack of blades placed face to face therein, and after being operated upon are transferred from the guideway to a similar galley. These galleys are identical in construction and are removably mounted in the machine so that they may be transferred from one machine to another for performing different operations successively upon the blades. In this form of the invention, the blades are transferred from the supply galley to the guideway, are moved through the guideway past the operating means, and are delivered from the guideway to the receiving galley by automatically acting mechanisms, so that in operating the machine it is necessary merely to place in the machine a supply galley containing a pack of blades to be operated upon and, after the completion of the operation on these blades, to remove the receiving galley containing a pack of treated blades from the machine.

The features of the invention will be clearly understood from the accompanying drawings, illustrating a machine embodying the invention in its preferred form and the following detailed description of the constructions therein shown.

In the drawings, Fig. 1 is a view in side elevation of a machine embodying the invention;

Fig. 2 is a view in side elevation of one of the series of units for operating on blades constituting the head of the machine;

Fig. 3 is a view in front elevation of the mechanism shown in Fig. 2;

Fig. 4 is a sectional view taken substantially on the line 4—4 of Fig. 3;

Fig. 5 is a sectional view taken substantially on the line 5—5 of Fig. 3;

Fig. 6 is a detail sectional view taken substantially on the line 6—6 of Fig. 2;

Figs. 7 and 8 are similar views in horizontal section illustrating respectively the galleys for receiving and supplying the blades and certain associated parts;

Fig. 9 is a view in front elevation, partly broken away and partly in section, illustrating the mechanism by which oil is supplied at the point of operation;

Fig. 10 is a detail sectional view taken substantially on the line 10—10 of Fig. 4; and Fig. 11 is a detail sectional view taken substantially on the line 11—11 of Fig. 3.

The machine illustrated and described in this application embodies certain novel features common to the present machine and the machine disclosed in applicant's copending application Ser. No. 396,667, filed July 16, 1920, for blade stropping machine.

The machine illustrated in the drawings of the present application comprises a series of blade sharpening units mounted side by side upon a single base. These units are identical in construction and arrangement of parts and for this reason only one of the units is illustrated in the drawings.

Each of the blade sharpening units comprises, in the preferred form of the invention, a rotary grinding wheel or disc 2 secured to one end of a shaft 4 mounted to rotate in bearings formed in uprights 6 on a slide 8. A pulley 10 is secured to the shaft 4 between the uprights 6 and the shaft is driven by means of a belt 12 passing about said pulley, over an idle pulley 14, about a driving pulley 16, and over a second idle pulley 18. The idle pulley 14 is fixed to a shaft 20 mounted to rotate in a bearing formed on an arm on the machine frame. The driving pulley 16 is fixed to a shaft 22 mounted in bearings in the frame of machine and constituting the main driving shaft of the machine. The idle pulley 18 is mounted so that it may be moved transversely with relation to the belt 12 to tighten or slacken the belt and thereby start or cause the stoppage of the rotation of the grinding wheel shaft. To this end, the pulley 18 is mounted upon the upper arm of a bell-crank lever 24 pivoted at 26 on the frame, the horizontally extending arm of which is provided at its forward end with a handle located in convenient position to be grasped by the operator. The belt is tightened to start the rotation of the grinding wheel shaft 4 by the elevation of the horizontal arm of the bell-crank. In order that the bell-crank may be held in position to keep the belt tight during the operation of one of the grinding units, the horizontal arm of the bell-crank carries a projection 28 arranged to engage in any one of a series of notches in a bar 30 secured to the frame of the machine. The projection 28 is engaged in and disengaged from the notches in the bar 30 by the lateral movement of the horizontal arm of the bell-crank allowed by the loose engagement of the pivot stud of the bell-crank therewith.

The blades are conducted past the grinding wheel by the passage of the blades through a guideway preferably constructed and arranged so that the blades may be passed therethrough by a movement of the blades edgewise or in a direction substantially parallel with the plane of the blades. In the present machine the guideway is constructed for the passage of the blades endwise therethrough. In the construction illustrated in the drawing this guideway is indicated at 32 and consists of a passage, of slightly greater thickness and width than one of the blades to be ground, formed by a groove in an upwardly extending rib or plate-like projection 34 on the frame of the machine and a plate 36 secured to the forward face of said rib. This passage preferably extends in a direction substantially perpendicular to the direction of operative movement of the grinding wheel at the point of operation or in a direction substantially parallel with the axis of the grinding wheel. The blades are delivered to the guideway 32 and removed from said guideway after the completion of the operation, preferably by a movement of the blades in a direction transverse to the plane of the blades. In the present machine, the plate 36 is provided with an opening 38 through which the blades are delivered to the passage 32 by a movement of the blades in a direction substantially normal to the blade plane, and with an opening 40 through which the blades are delivered from said passage by a similar movement of the blades after the completion of the grinding operation. The rib 34 is provided with an opening 42 to receive the edge of the grinding wheel, the extreme periphery of which rotates across the upper edge of the passage 32, as clearly shown in Fig. 11.

The blades are delivered to the passageway 32 with the edges thereof to be ground uppermost, as shown at 44 in Fig. 10, and are then moved endwise through said passageway past the grinding wheel. By the endwise movement of the blades through the passageway the upper edges of the blades are engaged with the periphery of the grinding wheel and the blades are ground upon one side during their movement past the wheel, the engagement of the blades with the guideway holding the blades accurately in predetermined relation to the grinding wheel so that the wheel grinds the edges of the blades on one side to a predetermined bevel. The grinding wheel preferably rotates in a direction against the edges of the blade being ground, so that the blade is held by the action of the grinding wheel against the lower face of the guideway 32.

In the present form of the invention, the blades after delivery through the opening 38 to the guideway 32, are moved endwise through said guideway past the grinding wheel by means of a reciprocating slide 46 engaging in said guideway. During the operative movement of the slide, a blade is carried from the position indicated at 44 in Fig. 10 past the grinding wheel to the position shown in dot-and-dash lines in said figure and indicated at 48. To one end of the slide 46 is secured a threaded rod 50 adjustably held by nuts 52 in a projection on a slide block 54 mounted to slide longitudinally on a rod 56 secured at one end in the frame of the machine. The block 54 is reciprocated on the rod 56 to impart the required movements to the slide 46 by means of a bell-crank cam lever 58 pivoted at 60 on the frame, the upwardly extending arm of which is engaged between projections on the block. The laterally extending arm of the cam lever 58 carries a cam roll 62 engaging the periphery of a cam disc 64 secured to a shaft 66. The upwardly extending arm of the cam lever 58 is acted upon by a coiled spring 68 which swings the lever in one direction and maintains the cam roll 62 in engagement with the cam disc 64. The cam disc 64 is preferably so constructed that a substantially uniform operative movement is imparted to the slide 46 to carry the blades through the guideway 32. The driving connections for the shaft 66 comprise a spiral gear 70 secured to said shaft and an intermeshing spiral gear 72 secured to a countershaft 74, a pulley 76 mounted on said countershaft, and a driving belt 78 passing about said pulley and about a pulley 80 secured to the shaft 20.

As stated above, each blade is carried by the operative movement of the slide 46 from the position indicated at 44 in Fig. 10 to the position indicated at 48 in said figure. During the next operative movement of the slide the succeeding blade, as it is moved through the guideway by the slide, engages the blade left in the position 48 and carries the same along the guideway into a position in registration with the opening 40.

The blades in the present machine are delivered successively through the opening 38 to the passageway 32 from a galley 82, and are transferred from said passageway through the opening 40 to a galley 84. These galleys preferably are identical in construction and are removably mounted on the machine, so that they may be carried from one to another of a series of machines for performing successive operation upon the blades, the receiving galley of one machine after being filled with blades being employed as the supply galley of the next machine and vice versa. The galleys are mounted in grooves in brackets 86 secured to the frame of the machine and are located between the plate 36 and pins 88 secured in the brackets. The galleys are provided with a central guideway formed by ribs 90 adapted to receive a series of blades placed face to face, as clearly shown in Fig. 4, the galleys being preferably located so that the guideways therein are substantially perpendicular to the guideway 32. Each galley carries at one end spring retaining pawls 92 having shoulders 94 arranged to extend over the ends of the last blade of the pack in the galley. To enable the blades to be delivered freely from the supply galley, the plate 36 carries beveled pins 96 arranged to engage the beveled ends of the retaining pawls and force the same back out of blade-engaging position when the galley in placed in operating position in the machine, as shown in Fig. 8.

The blades are forced along the supply galley in a direction substantially normal to the blade plane to carry the same successively through the opening 38 by means of an arm 98 arranged to engage the forward blade of the pack in the galley, as shown in Fig. 4. The arm 98 is secured to a slide block 100 mounted to slide longitudinally on a rod 102 supported at its ends in the frame. To the slide block 100 is secured one end of a cable 104 passing about guide pulleys 106 and 108, to the other end of which is secured a weight 110. The weight 110 tends to force the block 100 and the arm 98 toward the rear end of the supply galley and carries the stack of blades along the galley as the blades are passed successively through the passageway 32 by the slide 46.

To facilitate the insertion and removal of the supply galleys, the block 100 is mounted on the rod 102 so that it may be turned upwardly into the position shown in dot and dash lines, Fig. 2, and a pin 111 is mounted on the block and arranged to engage in a groove 113 in the frame to hold the block in this position. The rearward movement of the block is limited by an abutment screw 115.

The retaining pawls 92 of the receiving galley are allowed to assume their normal position as shown in Fig. 7, and each blade after it is moved into registration with the opening 40 is pushed from the guideway 32 by a movement in a direction substantially normal to the blade plane. During its movement is carried past the shoulders 94 on the pawls into position to be held by pawls, the ends of the blades engaging the beveled ends of the pawls and forcing the same back as the blades are carried into the galley. The blades are pushed through the opening 40 past the ends of the retaining pawls by means of a pusher 112 secured to the forward end of a rod 114 mounted to slide in an arm 116 on the frame so that the pusher is arranged to reciprocate rectilineally. Reciprocating movements are imparted to the pusher 112 by means of a cam lever 118 pivoted at 120 on frame, the upper end of which engages between projections on a block 122 adjustably mounted on the rod 114. The lower end of the cam lever carries a cam roll 124 arranged to engage a face cam on a cam disc 126 secured to the shaft 66. The cam lever 118 is acted upon by a coiled spring 128 which maintains the cam roll 124 in engagement with the cam disc 126 and imparts the rearward movement to the rod 114. To hold the blades in the receiving galley in position, a block 129 is slidably mounted in the central guideway in the receiving galley and is carried along the same as the blades are moved successively into the galley, the block being held in position merely by its weight.

To enable the grinding disc 2 to be adjusted with relation to the guideway 32 to regulate the depth of cut and also to compensate for the wearing down of the periphery of the disc, the disc is arranged for adjustment in a direction transverse to the guideway 32. This adjusment of the disc is effected by the adjustment of the slide 8. The slide 8 is mounted to slide on a dovetail rib or tenon 130 on the frame of the machine and is adjusted along said rib by means of a rotatable rod 132, the rear end of which is threaded into the slide. The rod 132 is rotatably mounted and held from longitudinal movement in suitable bearings on the frame, and to the forward end of the rod is secured a hand wheel 134 to enable the rod to be rotated manually. To enable a fine and accurate adjustment of the disc to be made, an abutment screw 136 is threaded into a projection 138 on the frame and is arranged to engage at its rear end the forward face of the slide 8. The slide is adjusted to locate accurately the grinding wheel by adjusting the abutment screw 136 and then bringing the slide up against the rear end of the screw by the rotation of the hand wheel 134. To hold the slide in adjusted position, the slide carries a laterally movable bar 139 mounted on adjusting screws 141 and arranged to engage the side of the rib 130.

In the present machine, one side only of each of the blades is ground during the passage of a series of blades from the supply galley through the guideway 32 to the receiving galley. In grinding the opposite sides of the blades, the blades are transferred from the receiving galley to the empty supply galley in reversed position and are again presented to the grinding mechanism. The blades may be ground upon both sides in one operation by arranging another grinding wheel on the side of the guideway 32 opposite the grinding wheel 2, so as to engage the opposite side of each of the blades and grind the same as the blades are passed through the guideway.

Oil is supplied to the grinding mechanism at the point of operation through a supply nozzle 140 secured in a holder 142 carried by a guard 144 partially surrounding the grinding disc. As will be noted from an inspection of Fig. 9, the machine is provided with several supply nozzles, one supply nozzle being provided for each grinding unit. The several nozzles are supplied with oil from a common oil supply tank, and after being used the oil is returned to the tank and is therein washed so that it may be used again. The supply nozzles are each connected by a pipe 146 with a transverse pipe 148 connected by pipe sections 150 and 152 with a pump 154. The pump 154 is connected by a pipe 156 with an oil washing or purifying supply tank 158. The tank 158 is partially filled with water, as shown in Fig. 9, the oil supply in the tank occupying the upper portion of the tank, as clearly shown in said figure. The outlet orifice, indicated at 160, through which the oil passes from the tank into pipe 156, is so located that it will always be considerably above the water line to eliminate the danger of drawing water from the tank into the outlet pipe 156. The oil, after being used by the several grinding units, is caught in a drip-pan 162 and is delivered from the pan through a pipe 164 to the tank 158. The lower end of the pipe 164 is connected with the tank at the bottom thereof and so that the oil as it enters the tank has to pass upwardly through the water in the tank and is cleansed of its impurities during its passage through the water. In order to increase the length of the path of travel of the oil through the water, a series of baffle plates 166 are mounted within the tank, as shown in Fig. 9, the path which the oil has to travel being indicated by the arrows in this figure. With this oil supplying system, the oil may be used over and over again in the machine, the particles of metal, grinding wheel dust and other impurities being separated from the oil in a reliable manner during its passage through the tank. The oil is pumped from the top of the tank through the connecting pipes to the supply nozzles, is caught by the drip-pan, delivered again to the tank and washed of its impurities, a continuous circulation of the oil being kept up during the operation of the machine.

In the operation of the present machine, before starting the machine a supply galley containing a pack of blades to be ground is placed in the machine, and an empty supply galley to receive the ground blades is also placed in the machine. The bell-crank lever 24 is then actuated by the operator to tighten the belt 12 and thereby start the grinding wheel. After the starting of the machine, the blades are fed from the supply galley, are presented to the grinding wheel, and are delivered to the receiving galley entirely automatically, no attention to the machine being required of the operator until the series of blades have been ground upon one side. After this part of the operation is completed, the blades in the receiving galley are transferred to the empty supply galley in reversed position and are again presented to the grinding wheel to grind the opposite sides of the blades and thereby complete the formation of the cutting edges. The transfer of the blades from the receiving galley to the supply galley in reversed position may be readily accomplished by placing the galleys end to end with the ends thereof opposite the pawls 92 in contact and then forcing the pack of blades along the guideway in the receiving galley into the guideway in the supply galley. After the completion of the grinding operation on both sides of the blades, the receiving galley with the ground blades therein is removed from the grinding machine and inserted in another machine for performing a subsequent operation on the blades. The provision of galleys for supplying and receiving the blades enables the blades to be handled easily and conveniently in each machine and to be transferred from one machine to another with much less labor than is ordinarily required in machines of this class.

It is to be understood that except as defined in the claims, the present invention is not limited to the particular construction and arrangement of parts of the illustrated embodiment of the invention, but that the invention may be embodied in other forms within the scope of the claims.

Having explained the nature and object of the invention, and having specifically described a machine embodying the invention in its preferred form, what is claimed is:

1. A machine of the class described, having in combination means for sharpening the edges of blades, means having a guideway arranged for sliding movement of the blades therethrough leading past the blade sharpening means in which the blades are brought into engagement with the sharpening means by the movement of the blades through the guideway and in which they are held while operated upon, a supply galley arranged to deliver blades to said guideway, a receiving galley arranged to receive blades from said guideway, and mechanism for sliding the blades in succession through the guideway and for causing the transfer of the blades in succession from the galley to the guideway.

2. A machine of the class described, having in combination means for sharpening the edges of blades, means having a guideway leading past the blade sharpening means and arranged for the sliding of the blades edgewise therethrough in which the blades are held while operated upon, a supply galley arranged to deliver blades to said guideway, a receiving galley arranged to receive blades from said guideway, and mechanism for sliding the blades in succession through the guideway and for causing the transfer of the blades in succession from the galley to the guideway.

3. A machine of the class described, having in combination means for sharpening the edges of blades, means having a guideway arranged for sliding movement of the blades therethrough leading past the blade sharpening means in which the blades are brought into engagement with the sharpening means by the movement of the blades through the guideway and in which they are held while operated upon, a supply galley arranged to hold a pack of blades and to deliver the same to the guideway by movement of the blades in a direction transverse to the blade plane, a receiving galley into which the blades are carried from the guideway by movement of the blades in a direction transverse to the blade plane, and mechanism for sliding the blades in succession through the guideway and for causing the transfer of the blades in succession from the supply galley to the guideway and from the guideway to the receiving galley.

4. A machine of the class described, having in combination means for sharpening the edges of blades, means having a guideway constructed for the sliding of the blades therethrough and arranged to guide the blades edgewise past the blade sharpening means in which the blades are brought into engagement with the sharpening means by the movement of the blades through the guideway and in which they are held while operated upon, a supply galley arranged to hold a pack of blades and to deliver the same in succession to the guideway by movement of the blades in a direction substantially normal to the blade plane, a receiving galley into which the blades are delivered from the guideway by movement of the blades in a direction substantially normal to the blade plane, and mechanism for sliding the blades in succession through the guideway, and for causing the transfer of the blades in succession from the supply galley to the guideway and from the guideway to the receiving galley.

5. A machine of the class described, having in combination means for sharpening the edges of blades, means having a guideway constructed for the sliding of the blades therethrough and arranged to guide the blades endwise past the blade sharpening means in which the blades are brought into engagement with the sharpening means by the movement of the blades through the guideway and in which they are held while operated upon, a supply galley arranged to hold a pack of blades and to deliver the same in succession to the guideway by movement of the blades in a direction substantially normal to the blade plane, a receiving galley into which the blades are delivered from the guideway by movement of the blades in a direction substantially normal to the blade plane, and mechanism for sliding the blades in succession through the guideway and for causing the transfer of the blades in succession from the supply galley to the guideway and from the guideway to the receiving galley.

6. A machine of the class described, having in combination means for sharpening the edges of blades, a supply galley provided with a guideway arranged to receive a series of blades placed face to face and to hold the same by engagement with one or more peripheral edges of the blades, a similar receiving galley, and means for taking the blades in succession from the supply galley, moving the blades endwise in a rectilinear path to carry the same past the blade sharpening means in contact therewith and then delivering the blades to the receiving galley.

7. A machine of the class described, having in combination a blade grinding device, means having a guideway in which blades are held while operated upon by the grinding device constructed for the sliding of the blades therethrough and arranged to hold the blades in position to grind the edges to a predetermined bevel, a supply galley arranged to deliver blades in succession to the guideway, a receiving galley arranged to receive the blades in succession from the guideway, and mechanism for sliding the blades successively through the guideway and for causing the transfer of the blades in succession from the supply galley to the guideway and from the guideway to the receiving galley.

8. A machine of the class described, having in combination means for sharpening the edges of blades, means stationary in the direction of movement of the blades and having a guideway extending past the operating means in which the blades are brought into engagement with the sharpening means by the movement of the blades through the guideway and in which they are held while operated upon, a receiving galley to receive the blades in succession from the guideway, and means for causing movement of the blades in succession through the guideway and from the guideway into the receiving galley.

9. A machine of the class described, having in combination a grinding wheel, means having a guideway extending past the grinding wheel and arranged for the sliding of the blades therethrough in which blades are held while being ground, a supply galley arranged to discharge blades into said guideway, a receiving galley arranged to receive blades from said guideway, and mechanism for sliding the blades in succession through the guideway and for causing the transfer in succession of the blades from the supply galley into the guideway.

10. A machine of the class described, having in combination a rotary grinding wheel, means having a guideway extending past the grinding wheel in a direction substantially parallel with the axis thereof and constructed for the passage of razor blades endwise therethrough in which the blades are held while being ground, a portable supply galley arranged to hold a pack of blades and located substantially perpendicular to the guideway, means for moving the blades through the galley in a direction substantially normal to the blade plane to carry the same successively into the guideway, means for moving the blades successively through the guideway, a portable receiving galley arranged substantially perpendicular to the guideway, and means for moving the blades successively from the guideway into the receiving galley by movement thereof in a direction substantially normal to the blade plane.

11. A machine of the class described, having in combination a rotary grinding wheel, means having a guideway extending past the grinding wheel in a direction substantially parallel with the axis thereof and constructed for the passage of razor blades endwise therethrough in which the blades are held while being ground, a portable supply galley arranged to hold a pack of blades and located substantially perpendicular to the guideway, an arm engaging the foremost blade in the supply galley, means tending constantly to move the arm to carry the blades successively into the guideway by a movement of the blades in a direction substantially normal to the blade plane, a portable receiving galley arranged substantially perpendicular to the guideway, a reciprocating slide operating in the guideway for moving the blades successively through the guideway, and a reciprocating pusher for engaging the blades and pushing the same from the guideway into the receiving galley by movement thereof in a direction substantially normal to the blade plane.

12. A machine of the class described, having in combination means for operating on blades, means having a rectilinear guideway leading past the operating means and arranged for the sliding movement of the blades therethrough in which the blades are brought into engagement with the operating means by the movement of the blades through the guideway and in which they are held while operated upon, a supply galley arranged to deliver blades to said guideway, a receiving galley arranged to receive blades from said guideway, and mechanism arranged to control at all times the movement of the blades for sliding the blades in succession through the guideway and for causing the transfer of the blades in succession from the supply galley to the guideway and from the guideway to the receiving galley.

13. A machine of the class described, having in combination means for operating on blades, means having a rectilinear guideway leading past the operating means and arranged for the sliding of blades edgewise therethrough in which the blades are brought into engagement with the operating means by the movement of the blades through the guideway and in which they are held while operated upon, a supply galley arranged to deliver blades to said guideway, a receiving galley arranged to receive blades from said guideway, and mechanism arranged to control at all times the movement of the blades for sliding the blades in succession through the guideway and for causing the transfer of the blades in succession from the supply galley to the guideway and from the guideway to the receiving galley.

14. A machine of the class described, having in combination means for sharpening the edges of blades, means stationary in the direction of movement of the blades and having a guideway leading past the blade sharpening means and arranged for the sliding of the blades therethrough in which the blades are held while operated upon, a receiving galley arranged to receive the blades from said guideway, and mechanism for sliding the blades in succession through the guideway and for causing the transfer of the blades in succession from the guideway to the receiving galley.

15. A machine of the class described, having in combination means for sharpening the edges of blades, means stationary in the direction of movement of the blades and having a guideway leading past the blade sharpening means and arranged for the sliding of the blades edgewise therethrough in which the blades are held while operated upon, a receiving galley arranged to receive blades from said guideway, and mechanism for sliding the blades in succession through the guideway and for causing the transfer of the blades in succession from the guideway to the receiving galley.

16. A machine of the class described, having in combination means for operating on blades, means having a rectilinear guideway in which the blades are brought into engagement with the operating means by the movement of the blades through the guideway and in which they are held while operated upon, a receiving galley arranged relatively to said guideway so as to receive the blades therefrom, and means arranged to control at all times the movement of the blades for passing the blades through the guideway past the operating means and projecting the same from the guideway into the receiving galley.

17. A machine of the class described, having, in combination, means for grinding the edges of blades, a receiving galley provided with a guideway to receive a series of blades placed face to face and to hold the blades by engagement with one or more peripheral edges of the same, and means for presenting the blades in succession to the blade grinding means by a movement of the blades in the plane thereof and then inserting the blades in the receiving galley.

Signed at Jersey City, New Jersey this 21st day of August, 1920.

FERDINAND G. HENRY.

Witnesses:
GEORGE WHITE,
MICHAEL J. KING.

Certificate of Correction.

It is hereby certified that in Letters Patent No. 1,512,889, granted October 21, 1924, upon the application of Ferdinand G. Henry, of New York, N. Y., for an improvement in "Machines for Operating on Blades," errors appear in the printed specification requiring correction as follows: Page 5, line 62, claim 2, page 7, lines 34 and 48, claims 14 and 15, after the word "are" insert the words *brought into engagement with the sharpening means by the movement of the blades through the guideway and in which they are;* and that the said Letters Patent should be read with these corrections therein that the same may conform to the record of the case in the Patent Office.

Signed and sealed this 27th day of January, A. D. 1925.

[SEAL.]

KARL FENNING,
*Acting Commissioner of Patents.*